US009697607B2

(12) United States Patent
Baumberg

(10) Patent No.: US 9,697,607 B2
(45) Date of Patent: Jul. 4, 2017

(54) METHOD OF ESTIMATING IMAGING DEVICE PARAMETERS

(71) Applicant: i2o3d Holdings Limited, Hertfordshire (GB)

(72) Inventor: Adam Michael Baumberg, Guildford (GB)

(73) Assignee: i2o3d Holdings Limited, Hertfordshire (GB)

( * ) Notice: Subject to any disclaimer, the term of this patent is extended or adjusted under 35 U.S.C. 154(b) by 0 days.

(21) Appl. No.: 15/186,899

(22) Filed: Jun. 20, 2016

(65) Prior Publication Data
US 2016/0300355 A1 Oct. 13, 2016

Related U.S. Application Data

(62) Division of application No. 14/681,375, filed on Apr. 8, 2015, now Pat. No. 9,396,542.

(30) Foreign Application Priority Data

Apr. 8, 2014 (GB) .................................. 1406296.2

(51) Int. Cl.
*G06K 9/00* (2006.01)
*G06T 7/00* (2017.01)
(Continued)

(52) U.S. Cl.
CPC .............. *G06T 7/0042* (2013.01); *G06T 7/73* (2017.01); *G06T 7/74* (2017.01); *G06T 19/006* (2013.01);
(Continued)

(58) Field of Classification Search
CPC ... G06T 7/0041; G06T 7/0044; G06T 19/006; G06T 2207/10004; G06T 2207/30244; G06T 2207/100016; H04N 5/232
See application file for complete search history.

(56) References Cited

U.S. PATENT DOCUMENTS 5,706,416 A * 1/1998 Mann .................... G06T 3/4038
345/427
6,249,616 B1 * 6/2001 Hashimoto ............... G06T 7/35
345/427
(Continued)

FOREIGN PATENT DOCUMENTS

EP 1 596 333 A1 11/2005

OTHER PUBLICATIONS

Intellectual Property Office of the United Kingdom, Patents Act 1977: Combined Search and Examination Report under Sections 17 and 18(3), Application No. GB1406296.2, dated Oct. 9, 2014 (4 pages).

*Primary Examiner* — Amir Alavi
(74) *Attorney, Agent, or Firm* — Wood Herron & Evans LLP

(57) ABSTRACT

A method is provided for estimating parameters of an imaging device with respect to an image of a scene said method comprising the steps of locating a target coordinate system in a scene, using an imaging device to capture an image of the scene, and processing the image using the target coordination system as a reference to estimate the parameters of the imaging device with respect to the image, wherein the target coordinate system comprises at least one planer target and wherein the at least one planar target contains a set of identifiable features with known relative positions.

25 Claims, 6 Drawing Sheets

(51) Int. Cl.
  *G06T 19/00* (2011.01)
  *H04N 5/232* (2006.01)
  *G06T 7/73* (2017.01)
(52) U.S. Cl.
  CPC ... *H04N 5/232* (2013.01); *G06T 2207/10004* (2013.01); *G06T 2207/10016* (2013.01); *G06T 2207/30204* (2013.01); *G06T 2207/30244* (2013.01)

(56) References Cited

U.S. PATENT DOCUMENTS

| | | | |
|---|---|---|---|
| 7,593,587 B1* | 9/2009 | Rosario | G06K 9/0063 |
| | | | 348/208.4 |
| 7,752,008 B2* | 7/2010 | Satoh | G06K 9/3208 |
| | | | 702/150 |
| 7,808,525 B2* | 10/2010 | Katayama | G01C 11/02 |
| | | | 348/175 |
| 9,396,542 B2* | 7/2016 | Baumberg | G06T 7/0042 |
| 2006/0153454 A1 | 7/2006 | Grimme | |
| 2007/0242899 A1 | 10/2007 | Satoh et al. | |
| 2008/0109184 A1 | 5/2008 | Aratani et al. | |
| 2015/0248584 A1* | 9/2015 | Greveson | G06K 9/00476 |
| | | | 382/113 |
| 2015/0287203 A1* | 10/2015 | Baumberg | G06T 7/0042 |
| | | | 382/103 |
| 2016/0300355 A1* | 10/2016 | Baumberg | G06T 7/0042 |

* cited by examiner

METHOD OF ESTIMATING IMAGING DEVICE PARAMETERS

CROSS-REFERENCE TO RELATED APPLICATIONS

The present application is a Divisional application of U.S. Ser. No. 14/681,375, filed Apr. 8, 2015, which claims priority under 35 U.S.C. §119 of Great Britain Patent Application No. 1406296.2, filed Apr. 8, 2014, the disclosures of which are hereby expressly incorporated herein by reference in their entireties.

FIELD OF THE INVENTION

This invention relates to a method of estimating imaging device parameters in relation to a captured image, including position and orientation or the imaging device, particularly for use in 3D modelling and Augmented Reality applications.

BACKGROUND OF THE INVENTION

The first stage in creating 3D models from photographs or other images is to estimate the 3D positions and orientations of the camera or other imaging device used to take the input photographs or other images. Similarly in Augmented Reality (AR) applications, a virtual camera position and orientation is required to overlay 3D graphical elements onto live video. In previous methods such as that used in 3D Software Object Modeller (3DSOM) Pro produced by Creative Dimension Software Ltd a single quite complex and known planar calibration pattern ("mat") is placed under the object. However for large objects it is not always practical to produce a suitably large calibration mat to place under the object.

Conventional photogrammetry (e.g., Microsoft® PhotoSynth® software) uses image scene structure to automatically estimate all camera parameters (orientation, position, focal length) from a large set of photographs of a scene—typically outdoors. However there are several drawbacks to this approach—it is computationally complex, requires large number of overlapping photos with suitable "natural" features that can be automatically matched. In practice users may wish to model a large object in a less cluttered environment where there are fewer reliable features and using fewer images.

In AR and mobile sensing, techniques exist called Simultaneous Localization and Mapping (SLAM) which is a technique used by robots and autonomous vehicles to build up a map within an unknown environment (without a priori knowledge), or to update a map within a known environment (with a priori knowledge from a given map), while at the same time keeping track of their current location. Visual SLAM (VSLAM) uses the same techniques for video images. These techniques do not require a prior target or map but require considerable processing power and may not be reliable enough for real world applications. In particular video tracking approaches can suffer from accumulation of tracking error as the camera is moved around the scene.

Gilles Simon, Andrew W. Fitzgibbon and Andrew Zisserman published a paper entitled Markerless Tracking using Planar Structures in the Scene (http://www.robots.ox.ac.uk/~vgg/publications/papers/simon00.pdf), which describes the use of one or more planes for camera tracking. However the approach essentially tracks a single plane at a time with a "hand-off" between tracking one plane and the next. The paper does not address the problem of reliably estimating the relationship between a plurality of planar targets and the targets which are not known a priori (i.e., the positions of features on the target planes is not known in advance) making the process less robust.

SUMMARY OF THE INVENTION

According to a first aspect of the present invention there is provided a method for estimating parameters of an imaging device with respect to an image of a scene said method comprising the steps of:
a. locating a target coordinate system in a scene;
b. using an imaging device to capture an image of the scene; and
c. processing the image using the target coordination system as a reference to estimate the parameters of the imaging device with respect to the image.
wherein the target coordinate system comprises at least one planer target and wherein the at least one planar target contains a set of identifiable features with known relative positions.

Preferably the method further comprises augmenting the image of the scene by displaying a rendered 3D model over the image of the scene.

Preferably the target coordination system comprise at least two planer targets and wherein each of the at least two planar targets individually contain a set of identifiable features with known relative positions within each respective planar target.

Whilst the at least two planar targets individually contain a set of identifiable features with known relative positions within each respective planar target, the precise relationship between the at least two planar targets in not known.

Preferably each planer target comprises a pattern of known size and position. The pattern may be for example a series of dots with known relative positions. Preferably the pattern is a series of dots in a 2×3 array, in the alternative the series of dots may be in a 3×4, 4×5, 3×5, or 4×4 array. Preferably at least one of the dots is a contrasting colour to the other dots, preferably the pattern of dots is arranged such that the pattern is not identical after a 180 degree rotation. The pattern or array is preferably one which comprises a series of easily detectable dots or blob features. In the alternative the planer target(s) may comprise for example paintings in an art gallery wherein front-on shots are taken of the paintings from which 2D positions of features in the flat paintings can be determined.

Preferably the imaging device comprises a camera.
Preferably the image is a photograph or video still.
Preferably the parameters of the imaging device to be estimated comprise the position and orientation of the imaging device.
Preferably a plurality of images are captured.
Preferably processing the image using the target coordination system as a reference to estimate the parameters of the imaging device in relation to the image comprises the steps of:
a. identifying the identifiable features of the at least two planer targets belonging to target planes;
b. determining the relationships between the at least two planar targets to calculate the positions of the identifiable features in a 3D space;
c. estimating the imaging device parameters using the calculated position of each of the identifiable features in the 3D space and associated 2D co-ordinates of each of the identifiable features determined from the image.

Preferably step b. includes determining the relationships between a plurality of pairs of planar targets to calculate the positions of the identifiable features in a 3D space and combining the results.

Preferably the combined results are averaged. Preferably more reliable results are combined and less reliable results are omitted. Preferably the reliability of the results are based on the percentage of images in which each of the planar targets of a pair are visible.

Preferably processing may be offline, real-time or a combination of the two. For example the processing may be divided between an offline processing of selected images for determining the relative planar target positions and subsequently performing real-time visual tracking using this pre-recorded information to estimate camera parameters for use in AR applications.

Preferably the estimated parameters of the imaging device in relation to the image are used in the reconstruction of 3D information.

Preferably the reconstruction of 3D information utilises standard techniques including shape-from-silhouettes.

Preferably the 3D information may comprise surface geometry, 3D point data or 3D mesh models.

Preferably 3D graphical elements are superimposed onto the images using the estimated parameters of the imaging device.

Preferably the method is for use in augmented reality applications.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
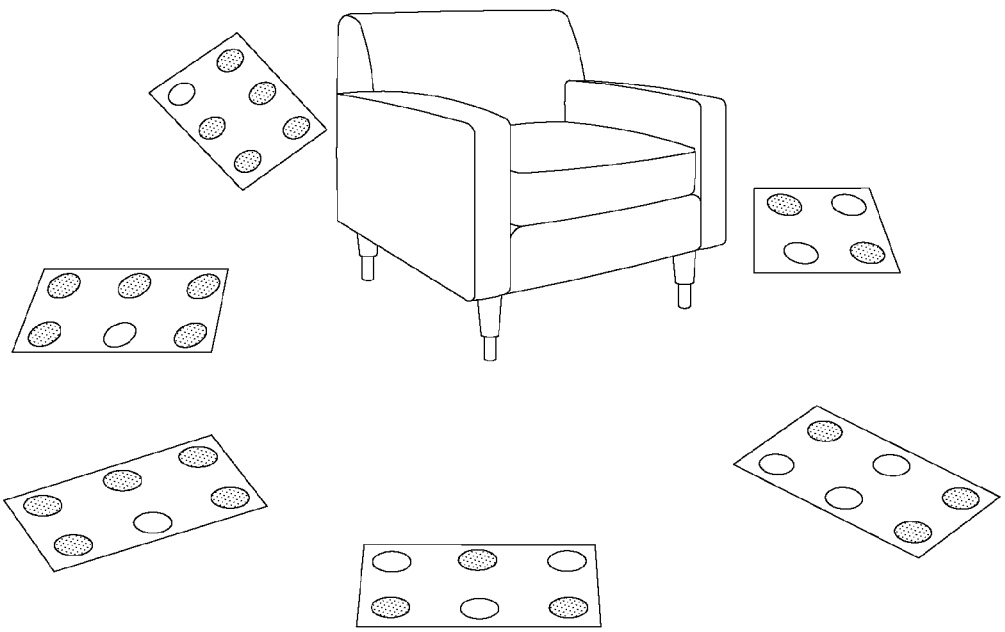
FIG. 1 illustrates a computer generated image illustrating the method of locating a plurality of planar targets to act as a target coordinate system in a scene to be imaged.
Figure 2:
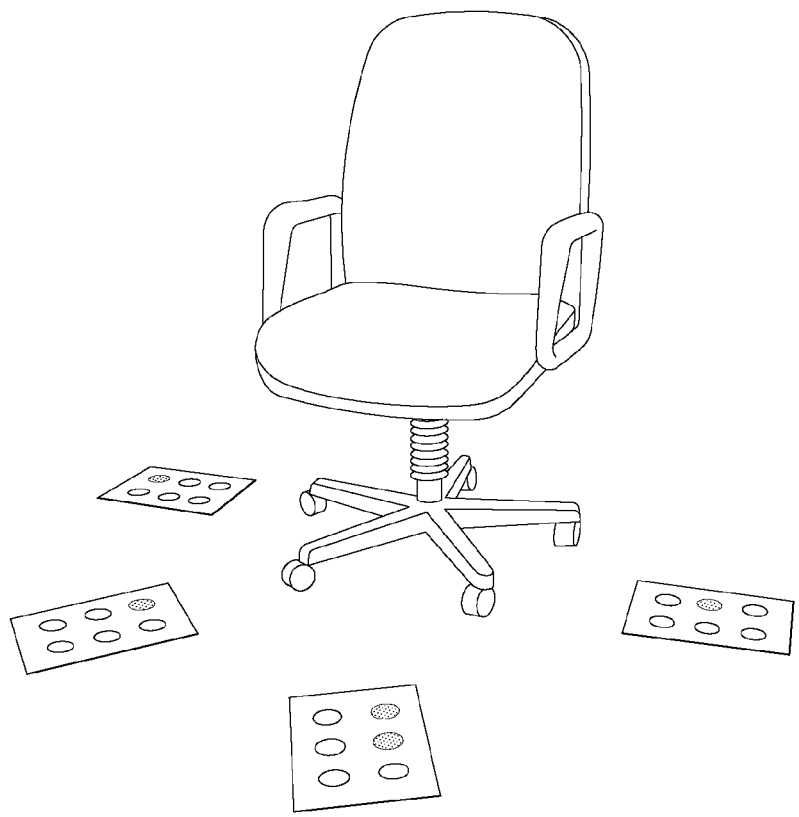
FIG. 2 illustrates a photograph with a plurality of planar targets in situ to act as a target coordinate system.

FIGS. 1 and 2 illustrate an embodiment of the method of the present invention. A set of planar targets which comprise known calibration targets are placed around the object or scene to be imaged (photographed) to act as the target coordination system. The position of the targets should be fairly random and unknown. In the embodiment illustrated the targets are known patterns (appearance and relative size is known), however in the alternative the targets may comprise for example paintings in an art gallery wherein front-on shots are taken of the paintings from which 2D positions of features in the flat painting can be determined. Specifically in the embodiment illustrated a set of A4 2×3 dot patterns with 2 colours (black and grey) have been used. It is important that the pattern used should allow for the orientation of the pattern to be identified, for example it would not be suitable to use only dots of a single colour in the embodiment illustrated, as there would be two indistinguishable orientations of the pattern for each given view. Thus, only patterns should be used that would not appear to be identical after a 180 degree rotation. The targets are either all placed around the object on the floor or in the alternative attached to walls for example so that the 2D surface of all the targets are in the same plane and so that for all the input images around the object at least 2 targets can be observed by the imaging device, which in the embodiment illustrated is a camera.

Once the targets have been located, images are then captured of the object or scene using the imaging device. Ideally, a number of images should be captured from different orientations.

Once the images have been captured the images are then processed and the targets detected. In one alternative existing planer target recognition such as the Vuforia® AR target tracker can be used to identify the positions of the targets in each image. In the alternative if the dot pattern is used as in the embodiment described the target position can be identified using the image processing technique outlined below:

detect dots using image processing "dot detection" algorithms, which are capable of detecting dark compact regions on a light background;
identify nearby dots and link them together;
detect arrays of dots, i.e., where there are more than 2 dots linked together;
keep 2×3 arrays of dots;
identify which dots are black and which are grey (can also use other colour combinations such as blue/green, etc.); and
create an ID from black/grey dot coding to determine which target each 2×3 array of dots corresponds to (taking account of symmetries).

Suitable dot detection algorithms use the standard approach have been described by Tony Lindeberg in Feature detection with automatic scale selection, International Journal of Computer Vision, 1998, Volume 30, Pages 79-116.

Once each target has been identified and its position in the image located it is then possible to determine the image position and 3D position in a 3D space for each dot on the target. In the embodiment illustrates the target dot coordinates are defined such that the dots lie on the X-Y plane and the centre of the target is (0,0,0). The position and orientation of the imaging device (camera) in the 3D space are then estimated using standard "3D to 2D" camera solving such as the OpenCV command "solvePnPRansac". (Open CV is the Open Source Computer Vision project available at opencv.org).

Estimating the 3D Position and Orientations of the Targets

For each image we now have:
a set of identified targets
an estimate of the camera position and orientation for each target in 3D space.

Figure 3:
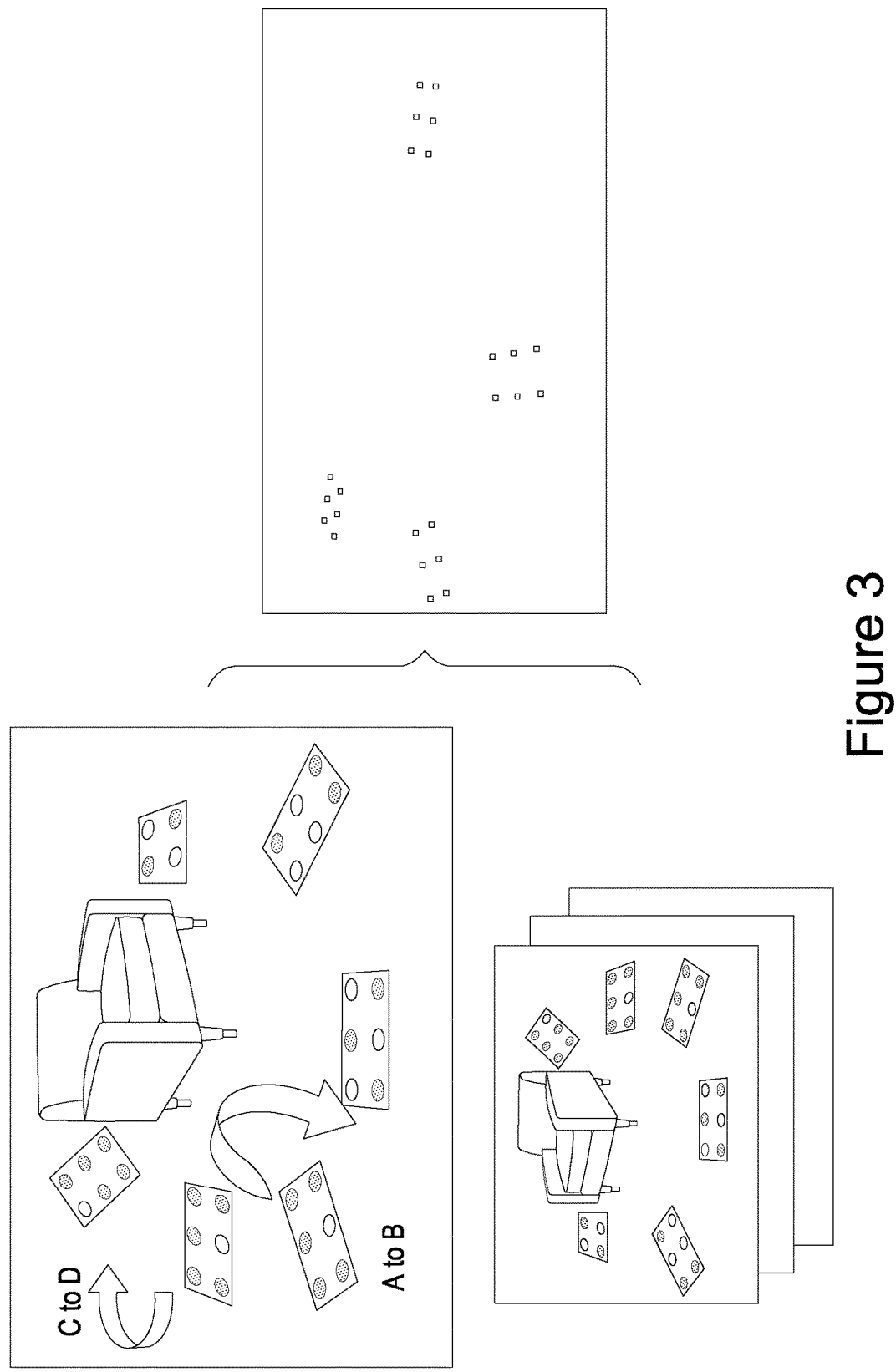
FIG. 3 illustrates the system of capturing data from the plurality of planar targets acting as a target coordinate system.

The position and orientation of all the targets in a "global" 3D space are now estimated. This is achieved by considering the relative position and orientation of pairs of targets. For any pair of targets A,B visible in a single image it is possible to estimate the relative translation and orientation of A relative to B using the camera estimates from targets A and B as illustrated in FIG. 3.

The target "connections" (relative position and orientation estimates) between pairs of targets are then averaged where we have more than one estimate (from multiple images in which both targets visible). The number of averaged estimates (ignoring outliers) are stored as a connection weight.

Starting from an initial "seed" target (the target visible in the most images), it is then possible to position and orientate "connected" targets to propagate the position of new targets with respect to the "seed" target in the global 3D space. To do this the most reliable (largest weight) connection between a new target and one that has been already processed (known orientation, position) is determined. The new target orientation and position is obtained by combining the known relative position and orientation for the connection with the known target position and orientation. This process is repeated until no more targets can be added.

Solving Camera Parameters

We now have an estimate of all the target positions and orientations which means each dot on each target has an estimated 3D position in the global 3D space. In addition for each image we have a set of 2D image coordinates for the known target dot (or other pattern) locations. Using standard "RANSAC" or other camera solving techniques the camera parameters (orientation and position) for each image are then estimated.

Global Optimisation

Once we have an initial estimate for camera and target positions and orientations, these parameters are optimised using standard "bundle adjustment" techniques so as to minimise the sum of square image projection errors. Given a set of images depicting a number of 3D points from different viewpoints, bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points. Bundle adjustment is almost always used as the last step of every feature-based 3D reconstruction algorithm. It amounts to an optimization problem on the 3D structure and viewing parameters (i.e., camera pose and possibly intrinsic calibration and radial distortion), to obtain a reconstruction which is optimal under certain assumptions regarding the noise pertaining to the observed image features.

Figure 4:
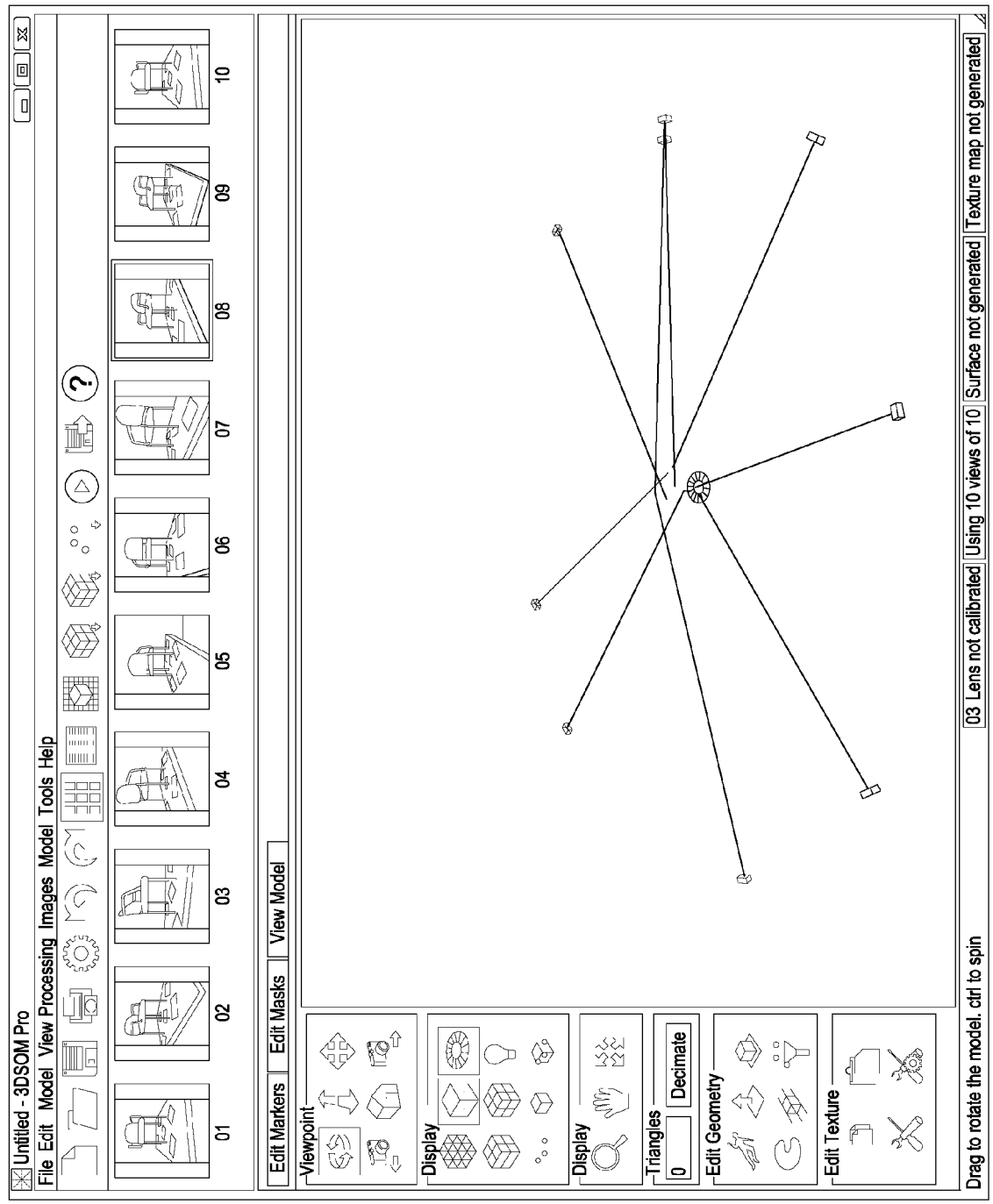
FIG. 4 illustrates a 3DSOM Pro visualisation showing recovered cameras from a sequence taken around a chair on an office table.

FIG. 4 illustrates a prototype visualisation showing recovered cameras from a sequence taken around a chair on an office table. One set of camera parameters failed to be recovered in the visualisation illustrated as there was no target completely visible in that image.

Applications and Scope of Invention

Camera estimation can be used as a first step in 3D model construction, e.g., by separating the shape of an object in each solved photo, we can use "shape from silhouettes" techniques to estimate a 3D mesh. The construction of a three-dimensional object model from a set of images taken from different viewpoints is an important problem in computer vision. One of the simplest ways to do this is to use the silhouettes of the object (the binary classification of is to use the silhouettes of the object (the binary classification of for the object. To efficiently represent this volume, an octree is used, which represents the object as a tree of recursively subdivided cubes. A suitable technique has been described in RICHARD SZELISKI, Rapid Octree Construction from Image Sequences, CVGIP; IMAGE UNDERSTANDING, Vol. 58, No, I, July, pp. 23-32, 1993 which describes an algorithm for computing the octree bounding volume from multiple silhouettes and applying it to an object rotating on a turntable in front of a stationary camera.

Due to the potential simplicity of the target detection and solving it is also possible to use this approach in a real-time augmented reality application. The targets could be placed around a room (home, office, showroom etc.) and used to calibrate the space by processing a sequence of images (video or stills) taken around the room. Once calibrated, virtual reality 3D models can be overlaid over live video as long as at least one of the targets is visible in the video—this vastly extends the potential for conventional target-based AR where a single target needs to be visible at all times.

Extensions for AR

Potentially the targets do not need to be known in advance. The user could take 2D images of any interesting planar objects in the scene, such as paintings in an art gallery, and these could be used as targets. The scale of the targets would have to be obtained in another way, e.g., by using a single distance estimate obtained by a range sensor or manually entered or estimated in another manner such as the user specifying the length of one side of the target.

Example Use of Simple Dot Pattern for Image Augmentation

Problem

How to insert a furniture or similar 3D model into a photo (or video) of a room wherein the 3D model needs to appear to scale and be positioned automatically.

Figure 5:
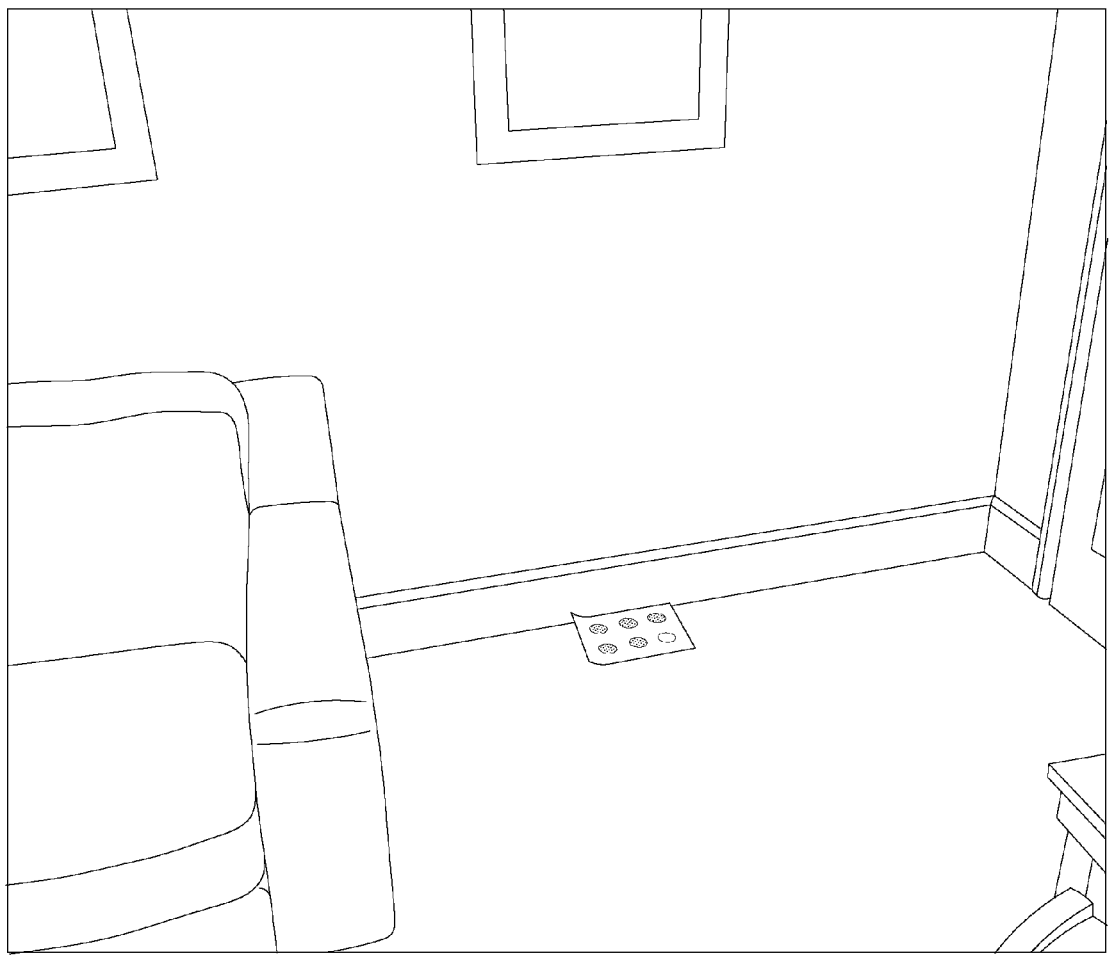
FIGS. 5 to 8 illustrate the steps in the method of inserting a 3D model into an image of a scene.

Solution:

The user places a planar target in the scene to be imaged as illustrated in FIG. 5. The target is A4 size in the embodiment illustrated and needs to be able to be reliably detected even when it is quite small in the image. Hence a simple target consisting of an array of 2 rows of 3 large dots in a pattern is used. The dots may all be of the same colour, for example black, or may be of different colours, for example a mixture of black and grey dots. The advantage of using simple grid over more complex patterns is that more complex patterns are not as reliable when the pattern takes up a small image area. When augmenting images it is important that the pattern only takes up a small area which is usually the case when augmenting a large object in a room.

The target is placed on the floor—the 3D model will be positioned in the same plane as the target and with the back of the object aligned to the back edge of the target which has been placed up against the room wall in the example scene. The 3D model will also be centred along the length of the target.

The size of the target is known and may be much smaller than the size of the 3D model which may be for example an item of furniture.

The input image illustrated in FIG. 5 has been taken using the camera on an iPad®—note that the quality of the image is low as it was taken hand-held.

Figure 6:
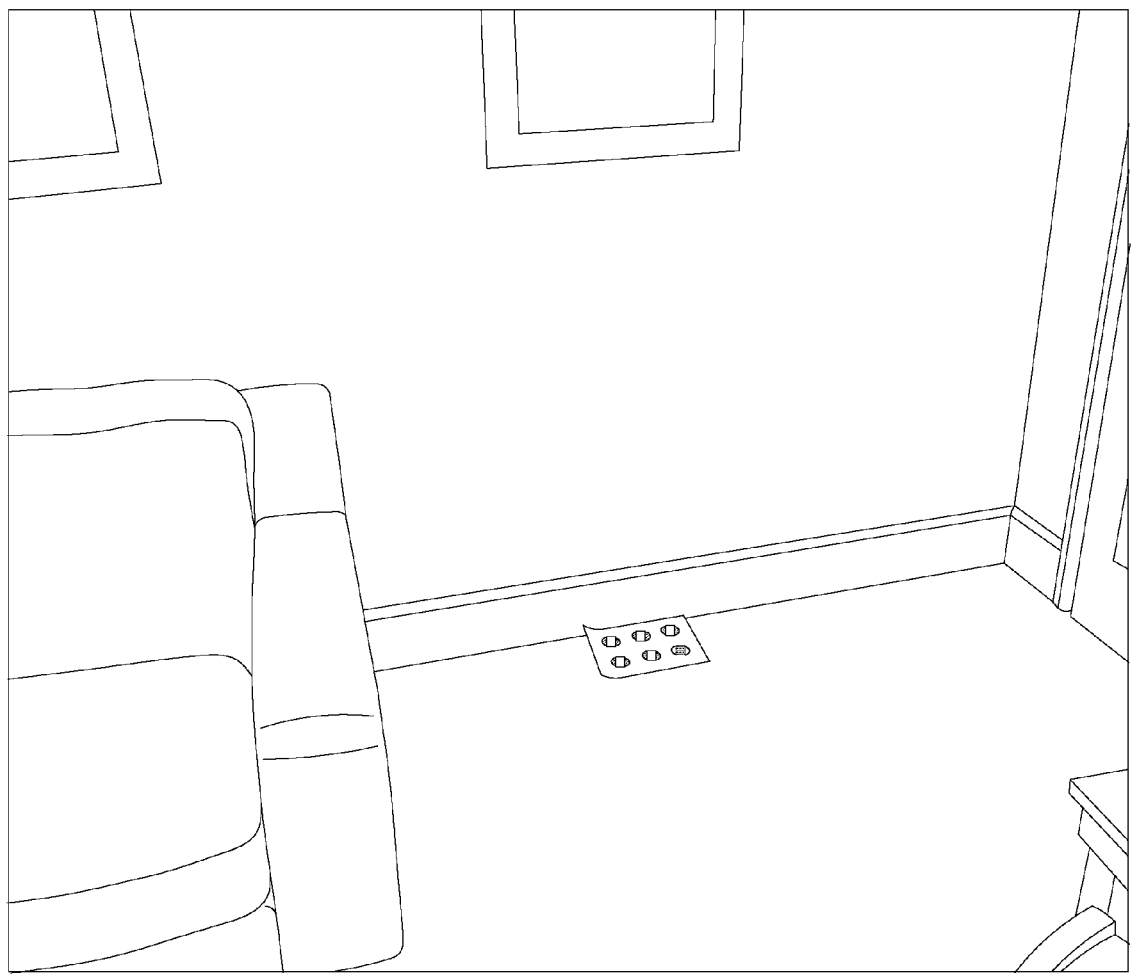
Figure 7:
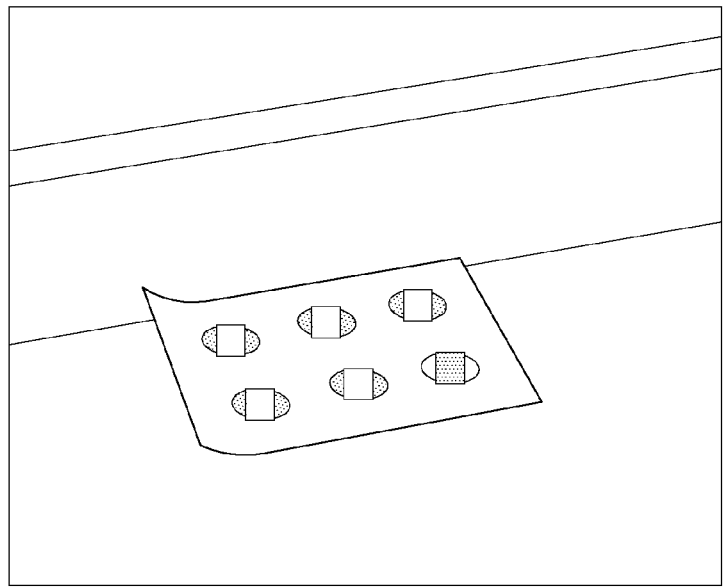

The input image was then processed by completing the following steps as exemplified in FIGS. 6 and 7:
  analysing the image with a "dot detector" which is capable of detecting dark compact regions on light background;
  for each detected dot detect up to 4 closest neighbours of similar size within search window based on dot size detected;
  locate closest neighbour dot to define vertical or horizontal direction;
  select up to 3 additional neighbour dots in horizontal-vertical directions;
  chain together linked dots into arrays; and
  identify the 2×3 array.

Figure 8:
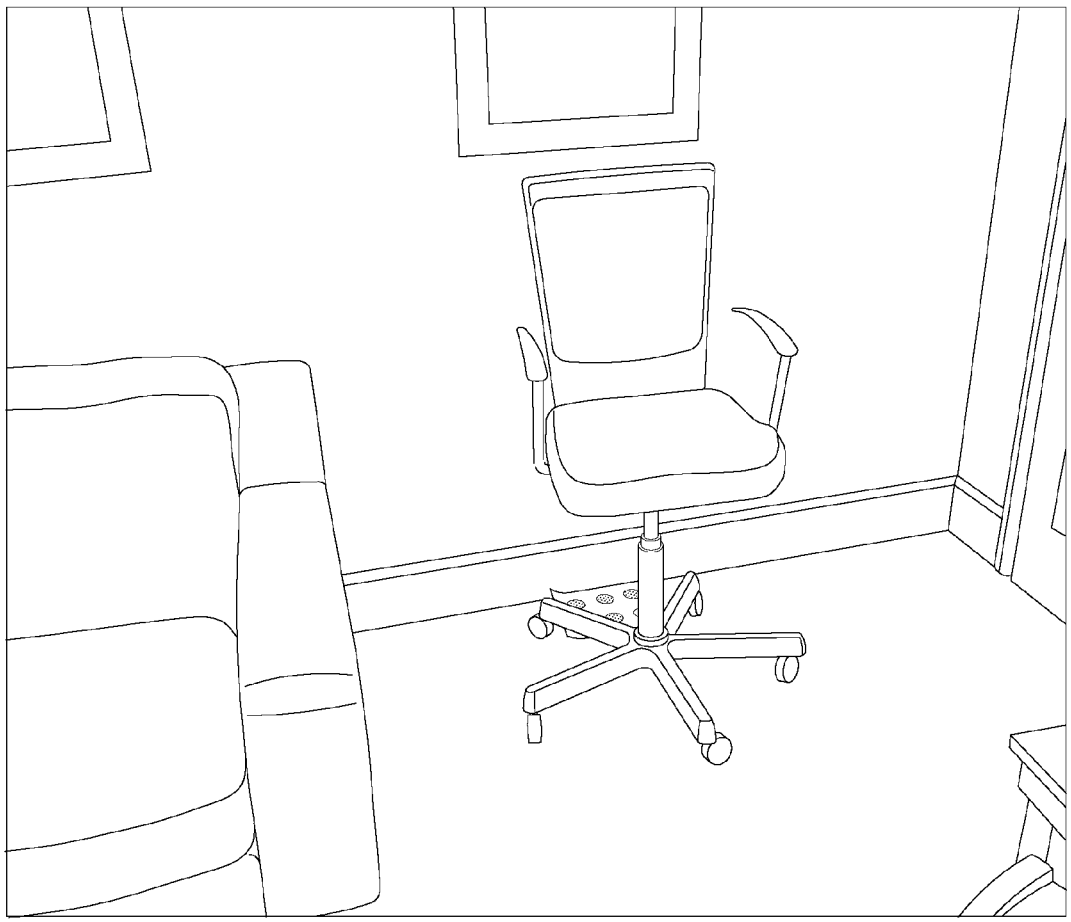

The 3D object is then overlaid onto the image with appropriate shadows using the estimated target position. In the example the target has 6 known points (dot centres) allowing the world to image 3D camera transformation to be determined (obtain the focal length data from JPEG tags if available). The 3D object can be placed in the same world coordinate frame positioned relative to the target and accurately scaled as seen in FIG. 8.

While the present invention has been illustrated by description of various embodiments and while those embodiments have been described in considerable detail, it is not the intention of the Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A method for estimating parameters of an imaging device with respect to an image of a scene said method comprising the steps of:
    locating a target coordinate system, comprising at least two planer targets, wherein each of the at least two planar targets individually contains a set of identifiable features with known relative positions within each respective planar target, in a scene;
    using an imaging device to capture an image of the scene; and
    processing the image using the target coordination system as a reference to estimate the parameters of the imaging device with respect to the image comprising the steps of:
        identifying the identifiable features of the at least two planer targets belonging to target planes;
        determining the relationships between the at least two planar targets to calculate the positions of the identifiable features in a 3D space; and
        estimating the imaging device parameters using the calculated position of each of the identifiable features in the 3D space and associated 2D coordinates of each of the identifiable features determined from the image.

2. The method as claimed in claim 1 further comprising augmenting the image of the scene by displaying a rendered 3D model over the image of the scene.

3. The method as claimed in claim 1 wherein each planar target comprises a pattern of known size and position.

4. The method as claimed in claim 3 wherein each planar target comprises a series of dots with known relative positions.

5. The method as claimed in claim 4 wherein each planar target comprises a series of dots in an array.

6. The method as claimed in claim 5 wherein each planer target comprises a series of dots in a 2×3 array.

7. The method as claimed in claim 6 wherein the pattern of dots is arranged such that the pattern is not identical after a 180° rotation.

8. The method as claimed in claim 4 wherein at least one of the dots is a contrasting colour to the other dots.

9. The method as claimed in claim 1 wherein the imaging device comprises a camera.

10. The method as claimed in claim 1 wherein the image is a photograph or video still.

11. The method as claimed in claim 1 wherein the parameters of the imaging device to be estimated comprise the position and orientation of the imaging device.

12. The method as claimed in claim 11 wherein more reliable results are combined and less reliable results are omitted.

13. The method as claimed in claim 12 wherein the reliability of the results are based on the percentage of images in which each of the planar targets of a pair are visible.

14. The method as claimed claim 1 in which a plurality of images are captured.

15. The method as claimed in claim 1 wherein the step of determining the relationships between the at least two planar targets to calculate the positions of the identifiable features in a 3D space includes determining the relationships between a plurality of pairs of planar targets to calculate the positions of the identifiable features in a 3D space and combining the results.

16. The method as claimed in claim 15 wherein the combined results are averaged.

17. The method as claimed in claim 15 wherein more reliable results are combined and less reliable results are omitted.

18. The method as claimed in claim 17 wherein the reliability of the results are based on the percentage of images in which each of the planar targets of a pair are visible.

19. The method as claimed in claim 1 wherein processing may be offline, real-time or a combination of the two.

20. The method as claimed in claim 1 wherein the estimated parameters of the imaging device in relation to the image are used in the reconstruction of 3D information.

21. The method as claimed in claim 20 wherein the reconstruction of 3D information utilises standard techniques including shape-from-silhouettes.

22. The method as claimed in claim 21 wherein the 3D information may comprise surface geometry, 3D point data or 3D mesh models.

23. The method as claimed in claim 20 wherein the 3D information may comprise surface geometry, 3D point data or 3D mesh models.

24. The method as claimed in claim 1 wherein 3D graphical elements are superimposed onto the images using the estimated parameters of the imaging device.

25. The method as claimed in claim 1 for use in augmented reality applications.

* * * * *